US011675759B2

(12) United States Patent
Russell et al.

(10) Patent No.: US 11,675,759 B2
(45) Date of Patent: Jun. 13, 2023

(54) DATACENTER INVENTORY MANAGEMENT

(71) Applicant: Dell Products L.P., Round Rock, TX (US)

(72) Inventors: Deborah C. Russell, Arvada, CO (US); Muzhar S. Khokhar, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 96 days.

(21) Appl. No.: 16/943,850

(22) Filed: Jul. 30, 2020

(65) Prior Publication Data
US 2022/0035782 A1    Feb. 3, 2022

(51) Int. Cl.
*G06F 16/00* (2019.01)
*G06F 16/21* (2019.01)

(52) U.S. Cl.
CPC ................. *G06F 16/219* (2019.01)

(58) Field of Classification Search
CPC . G06F 16/219; G06F 16/2474; G06F 16/2477
See application file for complete search history.

(56) References Cited

U.S. PATENT DOCUMENTS

| | | | | |
|---|---|---|---|---|
| 10,778,539 | B1* | 9/2020 | Hussain | H04L 41/5025 |
| 2003/0079160 | A1* | 4/2003 | McGee | G06F 11/0772 |
| | | | | 714/39 |
| 2010/0058157 | A1* | 3/2010 | Kelly | G06Q 20/202 |
| | | | | 714/819 |
| 2014/0266790 | A1* | 9/2014 | Al-Ali | G06F 11/30 |
| | | | | 340/870.09 |
| 2016/0173510 | A1* | 6/2016 | Harris | H04L 63/02 |
| | | | | 726/23 |
| 2017/0034023 | A1* | 2/2017 | Nickolov | H04L 43/0817 |
| 2017/0235622 | A1* | 8/2017 | Boyapalle | G06F 11/3409 |
| | | | | 714/47.2 |
| 2018/0048519 | A1* | 2/2018 | Outhred | H04L 41/0677 |
| 2019/0058626 | A1* | 2/2019 | Knowles | H04L 41/064 |
| 2019/0318039 | A1* | 10/2019 | Nozhchev | G06F 16/256 |
| 2019/0319839 | A1* | 10/2019 | Nozhchev | G06F 11/3447 |
| 2020/0278274 | A1* | 9/2020 | Shetty | G01M 99/005 |
| 2021/0011830 | A1* | 1/2021 | Khokhar | G06F 9/45533 |

* cited by examiner

*Primary Examiner* — Anhtai V Tran
(74) *Attorney, Agent, or Firm* — Jackson Walker L.L.P.

(57) ABSTRACT

An information handling system may include at least one processor and a non-transitory memory coupled to the at least one processor. The information handling system may be configured to: receive telemetry data from a plurality of information handling systems disposed at one or more datacenters; determine, based on the telemetry data, one or more drifted information handling systems, wherein the one or more drifted information handling systems differ from other information handling systems in the plurality of information handling systems and/or from a known-good state; and present a user interface indicating the one or more drifted information handling systems and providing a user interface element configured to remedy a drift of the one or more drifted information handling systems.

13 Claims, 4 Drawing Sheets

FIG. 3A 300

| Logical | Physical |

All vCenter Servers
 vcapp37.localdomai...
  VxRail-Datacenter
   VxRail-Virtual-SAN-Cluster-4f..
   VxRail-Virtual-SAN-Cluster-4f..
   VxRail-Virtual-SAN-Cluster-4f..
 vcapp100.localdomai...
  VxRail-Datacenter
   VxRail-Virtual-SAN-Cluster-4f..
   VxRail-Virtual-SAN-Cluster-4f..
   VxRail-Virtual-SAN-Cluster-4f..
 vcapp101.localdomai...
  VxRail-Datacenter
   VxRail-Virtual-SAN-Cluster-4f..
   VxRail-Virtual-SAN-Cluster-4f..
   VxRail-Virtual-SAN-Cluster-4f..
 vcapp102.localdomai...
  VxRail-Datacenter
   VxRail-Virtual-SAN-Cluster-4f..
   VxRail-Virtual-SAN-Cluster-4f..
   VxRail-Virtual-SAN-Cluster-4f..

All vCenter Servers
All vCenter Servers
Summary   Health Score   Events & Alarms   Storage   VMs

INVENTORY SUMMARY | CLUSTER INFORMATION

View and compare configuration data sent to manufacturer

VxRail Clusters (200)

Cluster Name ↓ ▽   (Show All (200))

⚠ <name>
  VxRail Version: v.6.7.000                    [COMPARE] ✕

✓ <name>
  VxRail Version: v.6.7.000                    [COMPARE] ✕

⚠ <name>
  VxRail Version: v.6.7.000                    [COMPARE] ✕

▷ <name>
  Update in progress. 10% complete <JOBID>     [COMPARE] ✕

<Cluster Name>   ✕
                          Total Hosts: 64

Cluster ID:              <text>
vCenter Server:          <text>
Site ID:                 <text>
Last Inventory:          January 10, 2020 4:00 PM CDT
Connected:               Yes
Total Appliances:        <##>
Hardware Health State:   ⓘ Critical
Operational State:       ✓ OK VxRail Version Status:   ⚠ Update available.
                            Learn More   Update
VxRail System Version:   <text>
VxRail Manager Plugin for
VMware vCenter:          <text>
vCenter Version:         <text>
vCenter License Type:    <text>
vSAN Version:            <text>
vSAN License Type:       <text>

[SELECT TO UPDATE]

Inventory    Updates

Actions ▼

▷ <name>
Update in progress.
10% complete <JOBID>          [COMPARE] ×      ⊘ <name>
                                                VxRail Version: v.6.7.000    [COMPARE]
⏱ <name>
Update pending. <JOBID>        [COMPARE] ×      ⊘ <name>
                                                VxRail Version: v.6.7.000    [COMPARE]
⊘ <name>
VxRail Version: v.6.7.000      [COMPARE] ×      ⊘ <name>
                                                VxRail Version: v.6.7.000    [COMPARE]
⊘ <name>
VxRail Version: v.6.7.000      [COMPARE] ×      ⊘ <name>
                                                VxRail Version: v.6.7.000    [COMPARE]

🛒 3 clusters

| <Cluster Name> × | <Cluster Name> × | <Cluster Name> × |
| Total Hosts: 64 | Total Hosts: 64 | Total Hosts: 64 |
| <text> | <text> | <text> |
| <text> | <text> | <text> |
| <text> | <text> | <text> |
| January 10, 2020 4:00 PM CDT | January 10, 2020 4:00 PM CDT | January 10, 2020 4:00 PM CDT |
| Yes | Yes | Yes |
| <##> | <##> | <##> |
| ⊘ Critical | ⊘ Critical | ⊘ Critical |
| ⊘ OK | ⊘ OK | ⊘ OK |
| ⊘ Up-to-Date | ⚠ Update available. Learn More  Update | ⓘ Update in Progress. View Details |
| <text> | <text> | <text> |
| <text> | <text> | <text> |
| <text> | <text> | <text> |
| <text> | <text> | <text> |
| <text> | <text> | <text> |
| <text> | | |

FROM FIG. 3A

DATACENTER INVENTORY MANAGEMENT

TECHNICAL FIELD

The present disclosure relates in general to information handling systems, and more particularly to the management of information handling systems such as server information handling systems in a datacenter.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system).

Existing enterprise solutions do not provide users the means for easily and quickly comparing and contrasting assets or inventory (e.g., clusters, datacenters, nodes, etc.) in their datacenter(s). Further, when comparing inventory, it can be difficult to apply actions to enhance or fix issues with the inventory, increasing cognitive load for the user.

For example, in the HCI context, the ideal situation is for all appliances to be symmetrical with regard to model number, hardware configuration, software versions, component vendor, etc. In reality, however, cluster sizes are dynamic, appliance components (e.g., fans, hard drives, etc.) may fail and may be replaced with different components, and there may be periods where software versions do not match on every appliance. While HCI solutions are typically intended to be operational even if there are hardware or software discrepancies, there may be instances where users need to take action on their inventory (e.g., to bring systems back into line with one another). In order to take action, the user must be able to locate and identify the inventory in question.

Accordingly, embodiments of this disclosure provide for significant improvements in the management of inventory such as HCI inventory.

It should be noted that, although this disclosure describes the example of HCI systems in detail for the sake of clarity and exposition, various aspects of this disclosure may in some embodiments be applied to traditional datacenters, individual compute/storage/networking devices, data centers, virtual machines, individual hardware components, etc.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with the management of server information handling systems in a datacenter may be reduced or eliminated.

In accordance with embodiments of the present disclosure, an information handling system may include at least one processor and a non-transitory memory coupled to the at least one processor. The information handling system may be configured to: receive telemetry data from a plurality of information handling systems disposed at one or more datacenters; determine, based on the telemetry data, one or more drifted information handling systems, wherein the one or more drifted information handling systems differ from other information handling systems in the plurality of information handling systems and/or from a known-good state; and present a user interface indicating the one or more drifted information handling systems and providing a user interface element configured to remedy a drift of the one or more drifted information handling systems.

In accordance with these and other embodiments of the present disclosure, a method may include an information handling system receiving telemetry data from a plurality of information handling systems disposed at one or more datacenters; the information handling system determining, based on the telemetry data, one or more drifted information handling systems, wherein the one or more drifted information handling systems differ from other information handling systems in the plurality of information handling systems and/or from a known-good state; and the information handling system presenting a user interface indicating the one or more drifted information handling systems and providing a user interface element configured to remedy a drift of the one or more drifted information handling systems.

In accordance with these and other embodiments of the present disclosure, an article of manufacture may include a non-transitory, computer-readable medium having computer-executable code thereon that is executable by an information handling system for: receiving telemetry data from a plurality of information handling systems disposed at one or more datacenters; determining, based on the telemetry data, one or more drifted information handling systems, wherein the one or more drifted information handling systems differ from other information handling systems in the plurality of information handling systems and/or from a known-good state; and presenting a user interface indicating the one or more drifted information handling systems and providing a user interface element configured to remedy a drift of the one or more drifted information handling systems.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 (which includes FIGS. 3A and 3B) illustrates an example user interface, in accordance with embodiments of the present disclosure.

DETAILED DESCRIPTION

Figure 1:
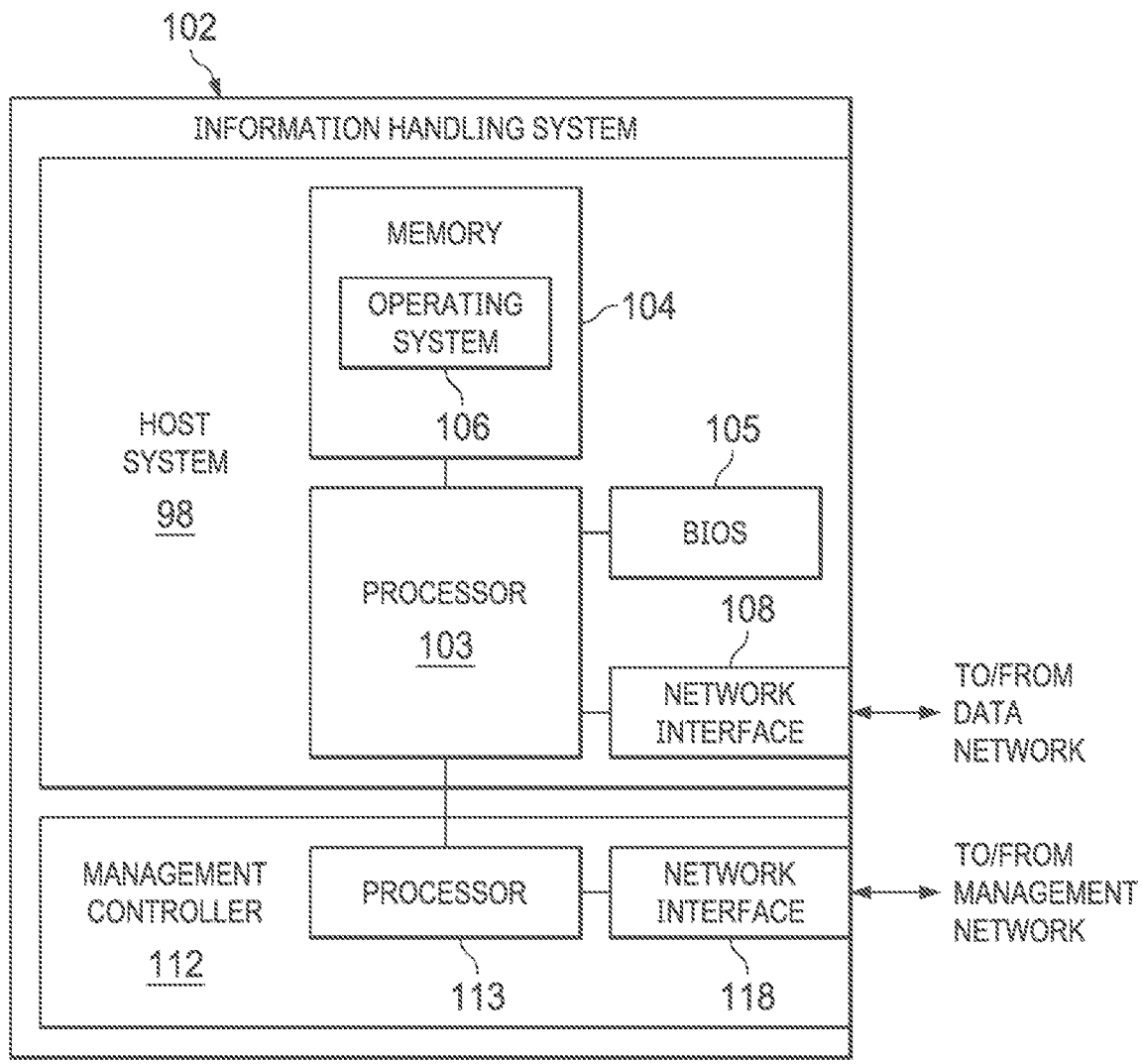
FIG. 1 illustrates a block diagram of an example information handling system, in accordance with embodiments of the present disclosure.
Figure 2:
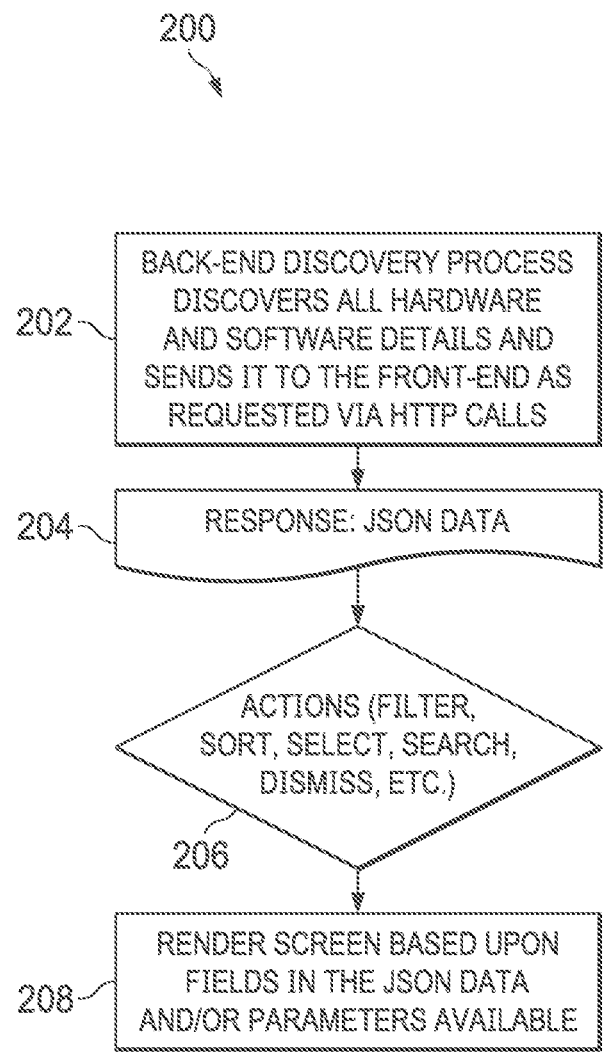
FIG. 2 illustrates an example method, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102 (e.g., by a user operating a management console). Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure may provide improvements in the management of datacenter and/or information handling system inventory such as HCI inventory. The ability to view assets or inventory is important for troubleshooting, debugging, auditing, preparing for changes, etc. Embodiments of this disclosure may provide users the opportunity to view, identify, and take action on clusters or appliances in a manner that mimics consumer shopping/buying metaphors (e.g., a "shopping cart" style view of assets). This disclosure builds upon the consumer model where users can compare products (e.g., existing inventory) and apply action(s) to such inventory (e.g., perform updates, purchase components, reboot, shut down, decommission, etc.). The current disclosure will use lifecycle management (LCM) as an example platform.

As used herein, the term LCM refers to an approach for upgrading components within a cluster of information handling systems such as an HCI cluster. During an LCM event, typically each node of a cluster may be upgraded with upgrade components such as firmware, drivers, application software, etc. until the entire cluster reaches the same system version.

Embodiments of this disclosure may provide a workflow that allows customers to view, compare, select, and configure HCI appliances in bulk that mimics online shopping and/or buying metaphors with minimal user input. To accomplish this, an application programming interface (API) may detect and group all appliance profiles, such that the system exposes (or hides) actions applicable to each respective resource.

Accordingly, some embodiments may provide a user interface (UI) to allow users to compare inventory (e.g., HCI clusters) in their infrastructure (similar to shopping online, but consolidated to one page in some embodiments) and apply actions to that inventory without the need to navigate to other pages to perform actions. For example, actions such as applying upgrades, fixing health scores, replacing components, etc. may be completed via such a UI page.

Some embodiments may include features for intelligent display of options. For example, consider the case where an administrator has accessed a list of several HCI systems, and some particular remediation action workflow is applicable to some of them, but not others. Embodiments may discriminate between the different systems, suggesting that particular workflow only for the systems where that workflow makes sense.

In some embodiments, an API according to this disclosure may at a high level operate as follows. A back-end system may discover resources and their details to output data (e.g., JSON data) from a manufacturer cloud system (e.g., LCM data, etc.) and aggregate all the inventory data to a single location. Such discovery may be accomplished, for example, via a software agent that executes on various systems within a datacenter (e.g., management controllers and/or host systems) and collects telemetry, which is then sent to the manufacturer's cloud systems. (For purposes of this disclosure, a manufacturer of an information handling system may refer to an original equipment manufacturer (OEM), distributor, wholesaler, retailer, etc., or in general any party that collects such telemetry data.)

The data collected by this back-end system may include information such as the total inventory (e.g., clusters, appliances, etc.), system version(s), appliance model numbers, hardware component model numbers and/or versions, etc. Such data may be stored in a list, map, table, or any other suitable data structure.

Further, a front-end system may determine which parameters can or cannot be configured, based on the JSON data. For example, the front-end system may display inventory items and their respective statuses such as asset names, general health status, software/hardware compliance, current operational state (e.g., task in progress), etc.

Accordingly, an improved customer experience may be enabled. For example, a customer may be able to view and compare discovered inventory, including current status information. A customer may also be able to select inventory and apply actions, requiring minimal user input. Further, configurations may be applied to individual systems or in bulk.

Turning now to FIG. 2, a flow chart is shown of an example method 200 for inventory management, in accordance with some embodiments of this disclosure. At step 202, a back-end system may perform a discovery process as discussed above to determine hardware and software details for any information handling systems at the client datacenter (s).

At step 204, in response to queries from a front-end system, the back-end system may provide the results of the discovery process. The queries may be implemented as HTTP calls in some embodiments, and the results may be returned in any suitable format such as JSON.

At step 206, a user of the system may select any desired action to work with the data. For example, the data may be filtered for certain characteristics, sorted, and/or searched, and/or individual systems may be selected or dismissed, etc.

At step 208, a UI screen may be rendered based upon the fields in the JSON data, the available parameters, and/or the actions specified in step 206.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Turning now to FIG. 3 (which includes FIGS. 3A and 3B), an example UI screen 300 is shown, in accordance with some embodiments. The results of method 200 of FIG. 2 may be used to populate various portions of screen 300, as shown. In particular, the method may allow for screen 300 to be dynamically populated with information based on a user's navigation. This may allow users to quickly determine metrics (e.g., that a cluster can be updated, or that a cluster is in a job, etc.). Users may also have the option to initiate tasks immediately or use the "add to cart" type of online shopping metaphor to select many clusters and initiate tasks in bulk.

Accordingly, embodiments of this disclosure may provide for a high-level view of a large number of HCI clusters, which may be in a single datacenter or may be geographically distributed. In some embodiments, such a high-level view may be provided in a single UI screen.

In some embodiments, metadata from various sources may be used to populate a UI with information about HCI clusters that allows various side-by-side comparisons. In this way, it can be determined that a particular system has a configuration that has "drifted" relative to other systems. Such a situation can then be easily remediated from the same UI, for example by triggering an LCM event, etc. For purposes of this disclosure, the term "drift" may refer to differences of a system relative to its peer systems, as well as differences of a system relative to some known-good state.

A single HCI cluster may include a large number of individual servers (e.g., typically 2 to 128, or even more in some embodiments). Each server may is turn have many factors that are subject to drift in terms of hardware, software, and/or firmware, thus implicating an enormous amount of data to be compared. Embodiments of this disclosure may ease the burden of such comparisons by distilling the differences down to something that an administrator can understand at a glance. Further, if detrimental drifting is detected, embodiments may also suggest appropriate remediations (e.g., hardware replacement, software upgrades, etc.).

Although this disclosure discusses in detail the example of installing updates (e.g., LCM events), one of ordinary skill in the art with the benefit of this disclosure will appreciate that its teachings may also be applied in other contexts.

For example, various analytics may be applied to the data as well, in some embodiments employing machine learning techniques. As one example, if a particular system is typically at 50% CPU utilization, then embodiments of this disclosure may determine that a 90% CPU utilization state is an example of an anomalous drift and flag that issue for an administrator in a UI screen. One of ordinary skill in the art with the benefit of this disclosure will readily appreciate other situations in which an anomalous drift may be referred to an administrator.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a non-transitory memory coupled to the at least one processor;
   wherein the information handling system is configured to:
   receive telemetry data from a plurality of information handling systems disposed at one or more datacenters, wherein the plurality of information handling systems comprise hyper-converged infrastructure (HCI) systems;
   determine, based on the telemetry data, one or more drifted information handling systems that differ from other information handling systems in the plurality of information handling systems according to a drift that comprises a difference in software version, wherein the one or more drifted information handling systems are peer systems of the other information handling systems and previously did not differ from the other information handling systems in the plurality of information handling systems according to the drift; and
   present a user interface indicating the one or more drifted information handling systems and providing a user interface element configured to remedy the drift of the one or more drifted information handling systems by initiating a lifecycle management event in response to actuation by a user;
   wherein the user interface is configured to indicate the plurality of information handling systems by displaying a first group including the one or more drifted information handling systems and a second group including the other information handling systems, wherein the user interface is further configured to expose an action with respect to the first group but not the second group, wherein the action is applicable to the one or more drifted information handling systems but is not applicable to the other information handling systems.

2. The information handling system of claim 1, wherein the user interface comprises a single page display.

3. The information handling system of claim 1, wherein the drift comprises a difference in one or more hardware components.

4. The information handling system of claim 1, wherein the user interface is configured to allow a user to filter, sort, and search the plurality of information handling systems.

5. The information handling system of claim 1, wherein the user interface is configured to provide a plurality of different user interface elements configured to remedy different types of drift of the one or more drifted information handling systems.

6. A method comprising:
   an information handling system receiving telemetry data from a plurality of information handling systems disposed at one or more datacenters, wherein the plurality of information handling systems comprise hyper-converged infrastructure (HCI) systems;
   the information handling system determining, based on the telemetry data, one or more drifted information handling systems that differ from other information handling systems in the plurality of information handling systems according to a drift that comprises a difference in software version, wherein the one or more drifted information handling systems are peer systems of the other information handling systems and previously did not differ from the other information handling systems in the plurality of information handling systems according to the drift; and
   the information handling system presenting a user interface indicating the one or more drifted information handling systems and providing a user interface element configured to remedy the drift of the one or more drifted information handling systems by initiating a lifecycle management event in response to actuation by a user;
   wherein the user interface is configured to indicate the plurality of information handling systems by displaying a first group including the one or more drifted information handling systems and a second group including the other information handling systems, wherein the user interface is further configured to expose an action with respect to the first group but not the second group, wherein the action is applicable to the one or more drifted information handling systems but is not applicable to the other information handling systems.

7. The method of claim 6, wherein the telemetry is collected via a software agent executing on at least one of the plurality of information handling systems.

8. The method of claim 7, wherein the software agent executes on a management controller of the at least one of the plurality of information handling systems.

9. An article of manufacture comprising a non-transitory, computer-readable medium having computer-executable code thereon that is executable by an information handling system for:
   receiving telemetry data from a plurality of information handling systems disposed at one or more datacenters, wherein the plurality of information handling systems comprise hyper-converged infrastructure (HCI) systems;
   determining, based on the telemetry data, one or more drifted information handling systems that differ from other information handling systems in the plurality of information handling systems according to a drift that comprises a difference in software version, wherein the one or more drifted information handling systems are peer systems of the other information handling systems and previously did not differ from the other information handling systems in the plurality of information handling systems according to the drift; and
   presenting a user interface indicating the one or more drifted information handling systems and providing a user interface element configured to remedy the drift of the one or more drifted information handling systems by initiating a lifecycle management event in response to actuation by a user;
   wherein the user interface is configured to indicate the plurality of information handling systems by displaying a first group including the one or more drifted information handling systems and a second group including the other information handling systems, wherein the user interface is further configured to expose an action with respect to the first group but not the second group, wherein the action is applicable to the one or more drifted information handling systems but is not applicable to the other information handling systems.

10. The article of claim 9, wherein the user interface comprises a single page display.

11. The article of claim 9, wherein the drift comprises a difference in one or more hardware components.

12. The article of claim 9, wherein the user interface is configured to allow a user to filter, sort, and search the plurality of information handling systems.

13. The article of claim 9, wherein the user interface is configured to provide a plurality of different user interface elements configured to remedy different types of drift of the one or more drifted information handling systems.

* * * * *